(12) United States Patent
Goldsmid et al.

(10) Patent No.: US 8,522,015 B2
(45) Date of Patent: Aug. 27, 2013

(54) AUTHENTICATION OF BINARIES IN MEMORY WITH PROXY CODE EXECUTION

(75) Inventors: Aaron Goldsmid, New York, NY (US); Ping Xie, Redmond, WA (US); Scott Miller, Redmond, WA (US); Nir Ben Zvi, Redmond, WA (US); Nathan Jeffrey Ide, Bothell, WA (US); Manoj R. Mehta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1212 days.

(21) Appl. No.: 12/163,792

(22) Filed: Jun. 27, 2008

(65) Prior Publication Data

US 2009/0327711 A1    Dec. 31, 2009

(51) Int. Cl.
 *H04L 9/32* (2006.01)
 *H04L 9/28* (2006.01)
 *H04L 9/00* (2006.01)

(52) U.S. Cl.
 USPC ............ 713/165; 726/26; 726/28; 726/30; 713/187; 713/190; 705/59; 705/71

(58) Field of Classification Search
 USPC .................................................. 713/165
 See application file for complete search history.

(56) References Cited

U.S. PATENT DOCUMENTS

| | | | | |
|---|---|---|---|---|
| 6,006,328 A | * | 12/1999 | Drake | 726/23 |
| 6,021,469 A | * | 2/2000 | Tremblay et al. | 711/125 |
| 6,668,325 B1 | * | 12/2003 | Collberg et al. | 713/194 |
| 6,681,329 B1 | | 1/2004 | Fetkovich et al. | |
| 6,779,114 B1 | * | 8/2004 | Chow et al. | 713/189 |
| 6,961,854 B2 | * | 11/2005 | Serret-Avila et al. | 713/176 |
| 7,181,603 B2 | | 2/2007 | Rothrock et al. | |
| 7,310,516 B1 | * | 12/2007 | Vacanti et al. | 455/414.1 |
| 7,334,263 B2 | * | 2/2008 | Szor | 726/22 |
| 7,356,679 B1 | * | 4/2008 | Le et al. | 713/1 |
| 7,813,822 B1 | * | 10/2010 | Hoffberg | 700/94 |
| 2003/0093685 A1 | * | 5/2003 | Tobin | 713/200 |
| 2004/0030912 A1 | | 2/2004 | Merkle, Jr. et al. | |
| 2005/0210275 A1 | | 9/2005 | Homing et al. | |

(Continued)

OTHER PUBLICATIONS

Discretix Technologies, Ltd., 'Secure Implementations of Content Protection (DRM) Schemes on Consumer Electronic Devices', Mar. 2011, entire document, http://www.arm.com/files/pdf/Secure_Implementation_of_Content_Protection_Schemes_on_Consumer_Electronic_Devices.pdf.*

(Continued)

*Primary Examiner* — Edan Orgad
*Assistant Examiner* — Ronald Baum
(74) *Attorney, Agent, or Firm* — Lee & Hayes, PLLC

(57) ABSTRACT

Presented is an anti-tampering method that validates and protects specific sections of a binary file. In one embodiment, this method permits a proxy engine to execute (via emulation by a virtual machine) the protected code on behalf of the binary in kernel mode upon successful completion of an integrity check. The integrity check can optionally check only the specific parts of code that the developer wishes to validate. The integrity check can cross binary boundaries. Moreover, the integrity check can be done on a hard drive or in memory. Furthermore, since the encrypted code is executed by the proxy engine in kernel mode, hackers are further deterred from modifying the code. Additionally, a method of creating a protected binary file is described herein.

20 Claims, 3 Drawing Sheets

(56) References Cited

U.S. PATENT DOCUMENTS

| | | | |
|---|---|---|---|
| 2006/0136720 A1* | 6/2006 | Armstrong et al. | 713/164 |
| 2006/0150256 A1 | 7/2006 | Fanton et al. | |
| 2006/0218544 A1* | 9/2006 | Chakraborty et al. | 717/168 |
| 2007/0106682 A1 | 5/2007 | Frank | |
| 2007/0192352 A1* | 8/2007 | Levy | 707/102 |
| 2007/0234430 A1 | 10/2007 | Goldsmid et al. | |
| 2007/0250863 A1* | 10/2007 | Ferguson | 725/46 |
| 2008/0004120 A1* | 1/2008 | Van Luchene et al. | 463/42 |
| 2008/0005560 A1 | 1/2008 | Duffus et al. | |

OTHER PUBLICATIONS

Haldar, et al., "Semantic Remote Attestation—A Virtual Machine directed approach to Trusted Computing", retrieved on Feb. 5, 2008, at <<http://www.usenix.org/events/vm04/tech/haldar/haldar__html/ >>, pp. 1-18.

Song, et al., "Utilizing Binary Rewriting for Improving End-Host Security", IEEE, vol. 18, No. 11, Nov. 2007, pp. 1-13.

* cited by examiner

AUTHENTICATION OF BINARIES IN MEMORY WITH PROXY CODE EXECUTION

BACKGROUND

Unfortunately, hackers and other individuals that wish to alter the behavior of software in an unauthorized manner frequently tamper with sensitive binary files. For example, hackers frequently attempt to gain access to Digital Rights Media (DRM) protected computer files, such as songs or other types of digital media files. In some instances, hackers can modify a media player's code to cause the media player to behave in ways that the original developer did not intend. For instance, a hacker can accomplish this by modifying parts of a binary that require copy protection keys that provide access to a protected file, such as a song, movie, or the like.

Hackers typically modify binaries when a binary is located in one of two locations. The first location is on a computer's hard disk or other storage medium. In this instance, hackers may modify the binary file before the file is loaded into memory. Second, hackers may modify the file once the file is loaded into memory.

Typically, the first method of attack is countered by cryptographically checking the hash of the binary and its signature. In contrast, attacks in memory are harder to defend against. This is because, only subsets of the binary may be loaded into memory at any given time. Furthermore, a binary may undergo tolerated modifications during runtime. This difficulty is compounded when code modification needs to be detected across a binary boundary. In other words, it is difficult to detect code modification in other binaries in the same process.

One method of detecting binary modification has been through checking the entire process space. However, this is often inefficient when the process space is of significant size. Another method is checking randomly across the entire process space. However, in this random fashion, a critical piece of code may go unchecked while a less critical piece of code is checked. Additionally, current directed checks are done either only within the same binary or the entire process space outside the binary. Thus, there is a need to detect modification of specific pieces of code across binary boundaries in memory and on hard drives.

SUMMARY

Presented is an anti-tampering method that validates desired sections of code and protects these sections of a binary file. This method permits a proxy engine to execute (via emulation by a virtual machine) the protected code (or any other code) on behalf of the binary in kernel mode. The integrity check via the proxy engine deters hackers, as the integrity check validates the desired portions of code. Moreover, integrity checks may further deter hackers with the check's ability to cross binary boundaries. Moreover, the integrity check can be done against a binary on a hard drive or in memory.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to accompanying figures. The use of the same reference numbers in different figures indicates similar or identical items.

DETAILED DESCRIPTION

Figure 1:
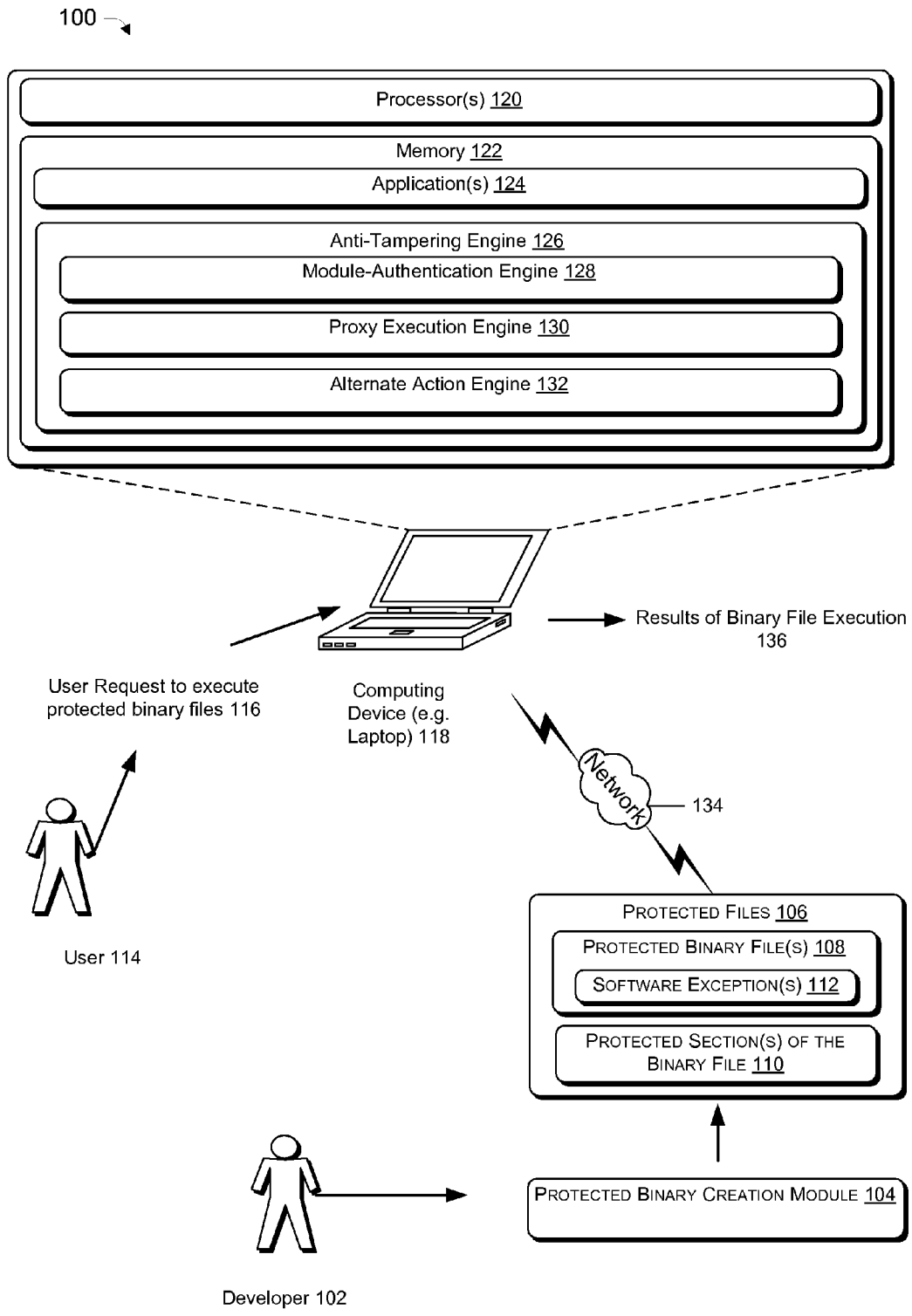
FIG. 1 depicts an illustrative architecture of a developer creating a protected file and a user executing the protected file on her computing device.

FIG. 1 depicts an illustrative architecture 100 in which anti-tampering methods may be employed. This architecture includes a developer 102 using a protected binary creation module 104 to create protected files 106. Files that may be desirable to protect might be a media player that plays licensed streaming music which in turn requires a license key for access. For instance, a hacker may wish to circumvent the license by modifying the media player in such a way that the media player no longer looks for a license key. The developer protects access to these files by creating protected files 106, which are used in place of the original files. These protected files may comprise a protected binary file 108 in which protected sections of the binary file 110 have been removed by developer 102. In place of the protected sections 110, the developer 102 places a software exception 112 within the protected binary file 108. Typically, this is done by the developer 102 after the developer decides which part(s) of the file he or she desires to protect. Such parts might be a critical section of code, such as code in the media player code that looks for a license key.

Once the developer 102 has created the protected files 106, a user 114 receives one or more of the protected files 106 and may then execute the protected file via computing device 118. The computing device may be a desktop computer, laptop computer, cellular phone, MP3 player or the like. Other computing devices can be used such as set top boxes, game consoles, portable media players, digital audio players and the like.

The computing device 118 is typically configured to interface with a user 114. Here, user 114, inputs a request 116 to execute protected binary files on computing device 118. Computing device 118 may accesses the protected files over a network 134 (e.g., the Internet) or otherwise. That is, device 118 may stream, download or otherwise gain access to the protected files for consumption on device 118. As described in detail below, computing device 118 employs the described techniques to efficiently and securely implement a binary file anti-tampering method.

As illustrated, device 118 includes one or more processors 120 as well as memory 122, upon which applications 124 and an anti-tampering engine 126 may be stored. Applications 124, anti-tampering engine 126 and/or the protected files 106 may be stored on computing device 118 or may be stored remotely.

The illustrated anti-tampering engine 126 is used to quickly and accurately determine if a protected file has been tampered with. Anti-tampering engine 126 accomplishes this via a module-authentication engine 128 as well as a proxy execution engine 130 (or simply "proxy engine"), which may execute one or more portions of the protected files 106. A proxy engine provides a relatively secure location to execute sections of code that are to be executed with other sections of code. The proxy engine may execute these sections of code via emulation. The proxy engine serves as an independent component (that is, a component that is separate from the protected binary file(s) 106). This provides an extra layer of security. The module-authentication engine 128, meanwhile, is used to detect impermissible modification in protected binary file(s) 108. One example of a permissible modification is relocation. Relocation occurs when binaries are built with an expectation as to where they will fit in the memory space of a process. However, it is possible that two binaries in the same process expect to load in the same range. When this occurs, the loader will make permissible modifications to all code which is dependent on this data which results in a relocation. Another example of a permissible modification is compensation for different processor architectures. Specifically, certain processors support instructions that other processors do not support. In this case, the OS kernel will make permissible modifications of an instruction tailored to a particular processor. A third example of a permissible modification occurs via tools which allow permissible modification of a subsection of code identified to have a bug. This allows modification without replacing the entire binary. As appreciated, these are non-limiting examples.

As illustrated, the module-authentication engine 128 attempts to detect an impermissible modification in a protected binary file(s) 108. In one embodiment, the protected binary file(s) 108 could be a media player. Using the example of protecting the media player itself, it is important to ensure that the section of code in the media player that checks for the existence of a valid digital media file license has not been impermissibly altered.

Upon successful authentication from module-authentication 128, the proxy execution engine 130 executes the protected section of the binary file 110 and, if there is any remaining code yet to be executed, the rest of the code from the protected binary file(s) 108. For instance, once module-authentication engine 128 confirms that no impermissible modification has occurred, the proxy execution engine 130 executes the protected sections that are required by the media player. This causes the digital media player to play the digital media file.

Again, the protected sections of the binary file 110 are typically removed from the protected binary file 108 (e.g., a media player or other file) by developer 102. In its place, the developer may have inserted software exception(s) 112. These software exceptions serve as place holders. In a non-limiting example, when the user 114 wishes to execute the protected binary file 108, the computing device begins execution of the file. When a software exception is encountered, module-authentication engine 128 examines desired sections of the protected binary file 108 and/or crosses the binary boundary to examine desired sections of other binary files for modification. If modification is not detected, then protected sections of the binary file 110 (which can be stored locally or remotely), are executed by the proxy engine 130 via emulation by a virtual machine, which yields the results of binary file execution 136. These results might be to play a protected music file on computing device 118 or, if tampering has been detected, other results may occur.

For example, if an intolerable or impermissible modification is detected, then the proxy engine 130 will not execute the protected sections of the binary file 110. Instead, alternate action engine 132 may take certain actions. For instance, alternate action engine 132 may crash the process, or may take one or more of other alternate actions, as discussed below. In one embodiment, anti-tampering engine 126, proxy execution engine 130 and alternate action engine 132 may be stored in or accessible by the same driver in the kernel.

Illustrative Processes

Figure 2:
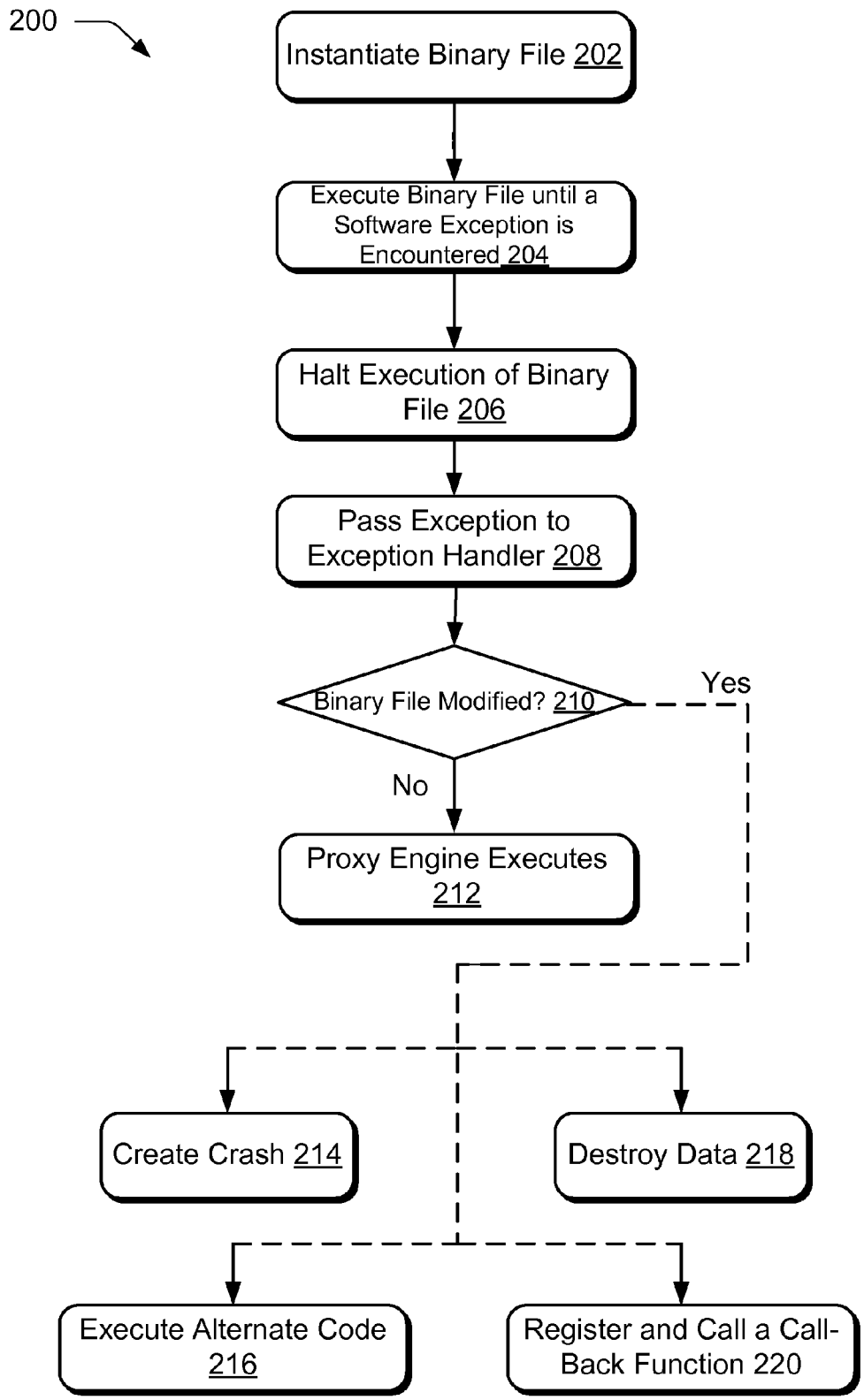
FIG. 2 depicts an illustrative method of executing protected files on the computing device of FIG. 1. This method also illustrates the possible acts that may occur if the protected file has been modified.
Figure 3:
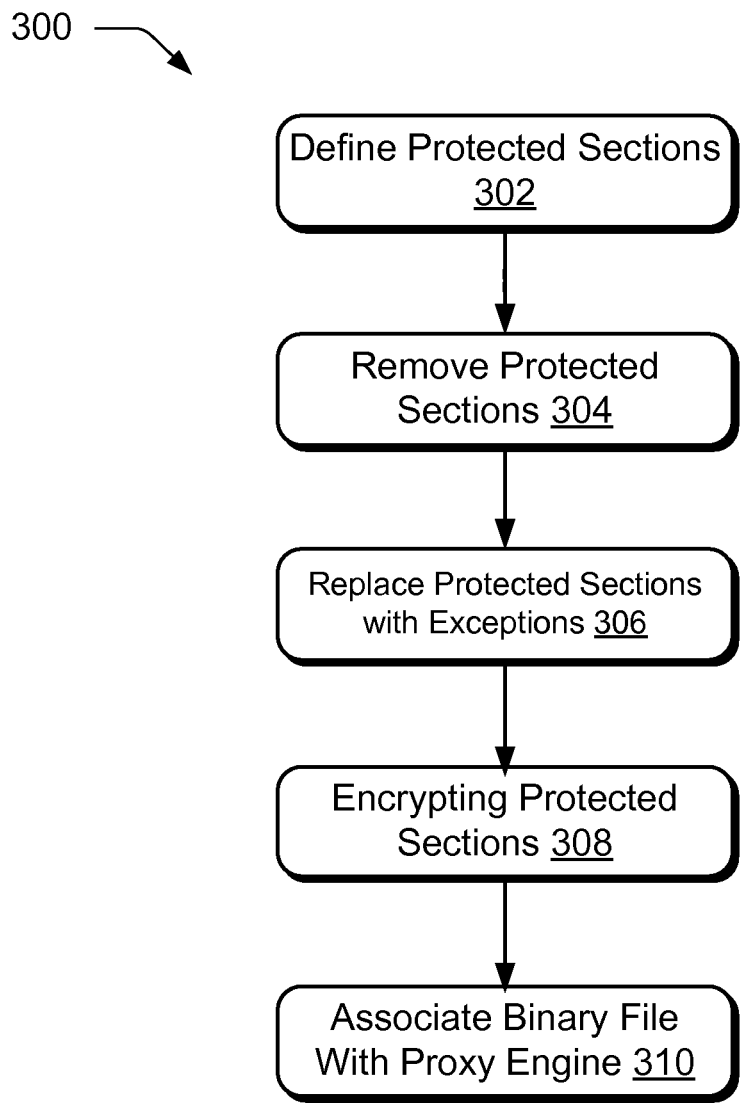
FIG. 3 depicts an embodiment to create a protected file.

FIGS. 2-3 are embodiments of processes relating to the prevention and/or detection of binary file tampering. For instance, process 200 (FIG. 2) illustrates an embodiment to prevent binary file tampering during execution. This is a further description of the behavior of protected binary creation module 104 from FIG. 1. Process 300 (FIG. 3), meanwhile, illustrates an embodiment to create protected binary files. Processes 200 and 300, as well as other processes described throughout, are illustrated as logical flow graph, which represent a sequence of operations that can be implemented in hardware, software, or a combination thereof. In the context of software, the blocks represent computer executable instructions that when executed by one or more processors, perform the recited operations. Generally, computer executable instructions include routines, programs, objects, components, data structures, and the like that perform particular functions or implement particular functions or implement particular abstract data types. The order in which the operations are described is not intended to be constructed as a limitation, and any number of the described operations can be combined in any order and/or in parallel to implement the process.

Execution of a Protected File

FIG. 2 illustrates process 200, which includes the execution of a protected binary while ensuring that a hacker has not modified the binary file before protected sections of the binary are executed. Specifically, in this anti-tampering embodiment, this method encrypts and stores certain parts of the binary file in proxy-executable form to be securely stored and then securely executed by a proxy engine when it is verified that no modification has occurred to the desired parts of the binary file.

First, a binary file is instantiated at 202. The binary file at 202 has been created in such a way that it is resistant to tampering (as explained above and described in more detail below). The binary file is executed until a software exception is encountered at 204. The execution is then halted at 206. The software exception is forwarded to the exception handler at 208 and then forwarded to the module-authentication engine 128 (see FIG. 1). Module-authentication engine 128 determines if the binary has been modified at 210. The binary is configured by the developer 102 in such a way that any further execution of the binary is not possible without the proxy engine 130 (see FIG. 1) emulating the protection sections of the binary file 110 (see FIG. 1). This is because these critical parts of the binary are removed, encrypted and in proxy-executable form. In this embodiment, the proxy engine is located in the kernel, which provides an environment that is more difficult for a hacker to tamper in. Modifications are undesirable as they may indicate that a hacker may have modified the binary file for nefarious purposes.

As discussed above, there are two locations where hackers typically modify binaries. The first location is the hard disk or other storage medium. In this instance, hackers modify the binary file before the file is loaded into memory. Second, hackers may modify the file once the file is loaded into memory. Typically, the first method of attack is countered by cryptographically checking the hash of the binary and its signature.

In contrast, attacks in memory are harder to defend against. This is because once the binary is loaded into memory, the binary is divided between multiple code pages. Furthermore, a binary may undergo tolerated or permissible modifications during runtime. This difficulty is compounded when verification that modification has not occurred is needed to cross the binary boundary. Specifically, this occurs when code modification needs to be detected in other binaries employed in the same process.

For example a DRM attack might only attack a memory image. The memory image is an attractive target for a hacker because it is difficult to know what data is supposed to be loaded in memory. Specifically, when code is loaded from the hard drive, it is typically loaded in a way that is difficult to predict, as loading differs from machine to machine. This situation is problematic, as the code as-loaded cannot be compared to a cryptographically-signed file during an integrity check. Therefore, it is necessary to update expectations given what we expect a properly functioning loader should do to the code. (Any difference between what the loader and other OS functionality should have done and what executes is memory is an impermissible modification.) Once this occurs, an integrity check is done by comparing the data that is loaded into memory to the data that was originally written by the developer. In this embodiment, an integrity check can be done by checking pages in memory by computing a hash and then comparing it against a cryptographically-signed file. This is done by the module-authentication engine 128 which can target and validate the hash and signatures of specific memory pages across the processes memory space. It is also possible to dynamically generate memory page hashes at runtime from the full binary hash and signature (explained below in detail in the virtual function embodiment). In other embodiments, the integrity check can be done by hashing the piece of protected code and comparing it with a predefined hash and then, using the hash of code as a parameter for other actions.

Additionally, this monitoring can also occur across binary boundaries. For instance, a binary's execution may be contingent upon another binary not being modified. For example, before proxy execution engine 130 executes the protected section from an illustrative "binary A", the proxy engine is informed by module-authentication engine 128 if specific pages in different binaries (binaries other than Binary A) have been modified. If modification did not occur in the different binaries, the proxy engine executes the protected section from binary A via emulation. Emulation is typically done in the kernel which permits specific parts of the different binaries to be monitored.

This permits a check of the functions (specific sections of code) across different binaries before binary A's protected section is emulated. Typically, the proxy engine and the exception handler are in kernel mode. Also, typical is that the binary to be validated and the protected binary file with protected sections removed are located in user mode.

Furthermore, the monitoring can encompass any change made not only to what is loaded into memory, but also to code that is modified by a hacker on the hard drive. Typically, this can be done by cryptographically checking the hash of the binary and its signature.

The monitoring by module-authentication engine 110 can be done in kernel mode, which gives a better view of the entire system and an additional layer of security in contrast to monitoring in user mode. Monitoring may also include instructing the operating system to check for debuggers. This can be done by querying system information to detect the existence of a debugger.

Furthermore, the proxy engine and module-authentication engine are typically not located in the protected binary. This provides an extra layer of security as the hacker must attack multiple files as opposed to a single file.

Referring back to FIG. 2, if 210 detects that the binary being executed has been modified (as detected by module-authentication engine 128), it is deduced that a hacker may have altered the binary. As such, emulation of the protected section may be aborted as a safeguard. Therefore, instead of emulating the protected section, one or more of the following events may occur.

The first event that may occur is creating a crash at 214. There are many ways a crash can be created. For example, a crash can be created by simply not executing the instructions by not handling the exception. The developer can then decide what to do with the unhandled exception. For instance, the developer can forward the exception elsewhere or not handle the exception at all which results in a crash. In another case, a crash can be created by executing the process but not emulating the instructions. This results in denying acts from the CPU's execution of a function which results in a crash from undefined behavior. In this case, it is likely that the application will crash long after the exception, which will make determining the cause very difficult.

A second event is executing alternate code at 216. An example of an alternate code sequence may be to run dummy code. The dummy code can be for a variety of purposes. For instance, the dummy code could be used to fool a hacker into thinking that she has actually accessed the protected sections of the binary file or the dummy code could be used to create a crash. The dummy code would typically be included in the protected sections of the binary file, in order for the address of the real code and the dummy code to both be contained in the protected sections of the binary file. This makes it difficult for the hacker to extract the exception flow. One of ordinary skill in the art would recognize other alternate code sequences to run.

In one embodiment, when the dated code executes and the exception is handled, the proxy engine queries some system information to detect the existence of a debugger. If a debugger is detected, then instead of emulating the instruction, the proxy engine would emulate the dummy code and pass back the context. This would create unexpected behavior and will crash the process in such a way that it would be difficult to directly determine that the proxy engine was the cause of the crash.

A third event is to destroy the data in memory at 218. Specifically a section of data in the memory of the computing device 128 such as a license key can be destroyed if the binary has been modified. The data would be zeroed out in memory in some instances. This would further prevent the protected sections of the binary file from being decrypted.

A fourth event is registering and calling a call back function at 220 when modification is detected. A variety of components can be configured to register and receive calls. For instance, a component could be registered to provide the user visual feedback (e.g. through the computing device's monitor) that the particular binary has been modified. Other events would be known to those of skill in the art.

However, if modification of the binary is not detected at 210, then the proxy engine decrypts and emulates the protected code on behalf of the binary at 212. This permits the proxy engine to execute the protected code on behalf of the binary via emulation. In addition, this process permits code execution based on an integrity check of specific parts of code that the developer wishes to validate. Furthermore, since the encrypted code is executed by the proxy engine in kernel mode, hackers are further deterred from modifying the code, as attacking code in kernel mode is relatively problematic and time consuming.

Creation of a Protected File

FIG. 3 illustrates a process 300 for creating a protected binary file. The protected binary file may be created in such a way as to detect when a hacker has modified the binary file in order to allow for remedial actions, such as the actions discussed above with regards to 214-220. To do so, critical sections of the code may be removed, encrypted and stored in proxy-executable form. This allows the proxy engine to execute the code in a form that is difficult for a hacker to modify either on the hard drive or in memory.

First, a file is examined and the protected sections are defined by developer 102 at 302. At this act, the developer selects the gated code paths that are desired. Gated code paths are those paths whose behavior changes when modification is detected. The protected sections are the sections of the file that a developer examines and selects to be executed by the proxy execution engine. These sections may be critical sections of the file. Critical sections can include for example, a license key or part of a media player that checks for a license, as well as any other portion(s) of a binary file. Defining these protected code sections can be done by defining a starting memory address and a number of code pages. Of course, other methods may be similarly employed.

Second, the protected sections of the binary file defined at 302 are removed from the binary at 304.

Third, the assembly instructions in the gated code paths are replaced with software exceptions at 306. This is done by replacing the protected code sections with software exceptions such as an int3 exception. As appreciated, each exception can be of different or similar types. For instance, some exceptions can require different decryption keys and/or methods. When the binary is executed and the software exception is encountered, the exception handler receives the software exception and informs the module-authentication engine 128. The module-authentication engine 128 then permits the proxy engine to emulate the protected sections. Typically, the proxy engine is run in kernel mode, although it need not.

Fourth, the protected sections of the binary file are encrypted and appended to the binary in proxy-executable form at 308. In one embodiment, the protected sections are appended to the binary. In other embodiments, the protected sections can be stored else where on the hard drive (and/or remotely).

Fifth, the binary file is associated with the proxy engine at 310. This association may occur as a byproduct of the replacement 306 and encryption 308, or may be a discrete act. In one embodiment, the association is such that the proxy engine is configured to emulate the protected sections of the binary file when called by the software exceptions when monitoring of the binary file has not detected an impermissible modification. The proxy engine can be configured to do one of the four 214, 216, 218 or 220 (see FIG. 2) if monitoring of the binary file detects modification.

Illustrative Embodiment

One example of these anti-tampering techniques is illustrated in the use of a Digital Rights Management (DRM) file (e.g., a music stream, movie stream, or other media file) whose use is contingent on the presence of a key that has not been tampered with. For instance, envision that a first binary, "binary A", is a protected binary which contains a key necessary for a media player to play a corresponding music stream. Envision also that binary A has a protected section (for instance, a specific part of the key) that has been removed, encrypted and stored in a proxy-executable form. In place of the protected binary section is a software exception that is used to call an exception handler.

When the media player begins execution of the binary file, the binary executes until the software exception is encountered. At this point, the software exception is routed to an exception handler, then to the module-authentication engine and then to the proxy engine. The module-authentication engine may determine if the file has been impermissibly tampered with or modified and, if not, may permit the proxy engine to emulate the protected sections of code.

In one embodiment, monitoring includes running an integrity check that is done at runtime using virtual functions, wherein the integrity of virtual functions themselves is validated. Virtual functions may be used because of the various difficulties of implementing integrity checks at runtime.

Furthermore, virtual functions are particularly useful in object-oriented languages that use high level descriptions. In an objected-oriented language environment, a hacker can change, at runtime, data in memory that is not found in the original binary. This modification may go undetected because certain data at runtime cannot be compared to known data before runtime. This is because the correct functions are only known at runtime.

Thus, this embodiment uses dynamic modeling at runtime to enable the correct functions to be known and checked at runtime (such as the contents of a virtual table), in contrast to using data at static addresses for the integrity check.

In some instances, a check is first made to ensure that the virtual function table (e.g. the address of the virtual table) has not been modified. Second, another check may be made to ensure that the function that the virtual table points to has not been modified. This detects tampering by a hacker who changes a pointer to point to other functions.

If the module-authentication engine does not detect modification, then the proxy engine emulates the protected sections. Emulation of the protected sections permits the removed and encrypted sections of the key to be decrypted and executed by the proxy engine on behalf of the binary. Decrypting and executing the removed and encrypted sections of the key in the proxy engine in kernel mode presents many challenges to a hacker as opposed to decrypting and running the removed and encrypted sections of the key in user mode. Therefore, by emulating these sections of code in the proxy engine in the kernel, a would-be hacker is prevented from easily accessing the protected sections and, hence the file as a whole. Instead, the hacker is subject to one or more of the alternate actions discussed above, such as a process crash, the running of dummy code, or the like.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method under control of a computer including one or more processors configured with executable instructions to perform acts comprising:

instantiating, in a media player to playback licensed media items after acquiring a license key to the licensed media items, a binary file that includes at least one exception in place of a removed section of the binary file, the removed section including at least a portion of a key to enable access to a media file that incorporates digital rights management, the removed section encrypted and comprising computer instructions for execution by a proxy engine, the binary file used by the media player to acquire a particular license key associated with a particular licensed media item before enabling playback of the particular licensed media item using the media player;

executing the binary file until the at least one exception is encountered;

halting the execution of the binary file when the at least one exception is encountered;

before execution of the removed and encrypted section of the binary file, determining if the binary file has been modified;

in response to determining that the binary file has been modified, performing at least one of:
- creating a process crash;
- executing an alternate code path;
- destroying data stored in memory; or
- registering and calling a call back function; and in response to determining that the binary file has not been modified,
- emulating the removed and encrypted section of the binary file by the proxy engine.

2. The method of claim 1, wherein the emulating of the removed and encrypted section of the binary file by the proxy engine occurs in kernel mode.

3. The method of claim 1, wherein the determining comprises determining if a hash of specific memory pages of the encrypted and removed section of the binary file match those in a previously-stored and cryptographically-signed catalog file.

4. The method of claim 1, wherein the determining occurs over a network.

5. The method of claim 1, wherein the determining occurs in storage.

6. The method of claim 1, wherein the determining occurs across binary boundaries.

7. The method of claim 1, wherein the determining uses at least one virtual function, wherein the integrity of the at least one virtual function is validated.

8. The method of claim 1, wherein the removed and encrypted section of the binary file is appended to the binary file.

9. The method of claim 1, wherein the removed and encrypted section of the binary file is stored remotely from the binary file.

10. A computer-readable storage device having computer-executable instructions that, when executed on one or more processors, perform acts comprising:
instantiating a first binary file that includes at least one exception in place of a removed section of the first binary file, the removed section including a portion of a key to enable access to a media file that is protected by digital rights management, the removed section being encrypted and comprising computer instructions for execution by a proxy engine, the binary file comprising a license acquisition component of a media player;

executing the first binary file until the at least one exception is encountered;

before execution of the removed and encrypted section of the binary file, determining if a second binary file has been modified; and if it is determined that the second binary file has not been modified, then
emulating the removed and encrypted section of the first binary file by the proxy execution engine via a virtual machine.

11. The computer-readable storage device of claim 10, further comprising halting execution of the first binary file when the at least one exception is encountered.

12. The computer-readable storage device of claim 10, further comprising:
if it is determined that the second binary file has been modified, then:
- creating a process crash;
- executing an alternate code path;
- destroying data in memory; or
- registering and calling a call back function.

13. The computer-readable storage device of claim 10, wherein the emulating of the removed and encrypted section of the first binary file by the proxy engine occurs in kernel mode.

14. The computer-readable storage device of claim 10, wherein the determining comprises determining if a hash of specific memory pages of the removed and encrypted section of the first binary file match those in a previously-stored cryptographically-signed catalog file.

15. The computer-readable storage device of claim 10, wherein the determining occurs over a network.

16. The computer-readable storage device of claim 10, wherein the determining occurs in kernel mode.

17. The computer-readable storage device of claim 10, wherein determining that the second binary file has not been modified comprises:
validating an integrity of at least one virtual function; and
determining that the second binary file has not been modified via the at least one virtual function.

18. A method under control of a computer including one or more processors configured with executable instructions to perform acts comprising:
defining one or more protected sections of a binary file that is included in a media player, the binary file used to determine whether a license key has been acquired prior to playback of a licensed media item by the media player;
removing the one or more protected sections of the binary file;
replacing the one or more protected sections of the binary file with at least one software exception;
encrypting the one or more protected sections of the binary file; and
associating the binary file with a proxy engine that is configured to emulate via a virtual machine the one or more protected sections of the binary file when called by the at least one software exception and when it is determined that the binary file has not been modified.

19. The method of claim 18, wherein the protected sections of the file are appended to the binary file in proxy-executable form.

20. The method of claim 18, wherein determining that the binary file has not been modified is performed via at least one virtual function.

* * * * *